R. BAILEY.
Coal Stove.
No. 51,681.
2 Sheets—Sheet 1.
Patented Dec. 26, 1865.
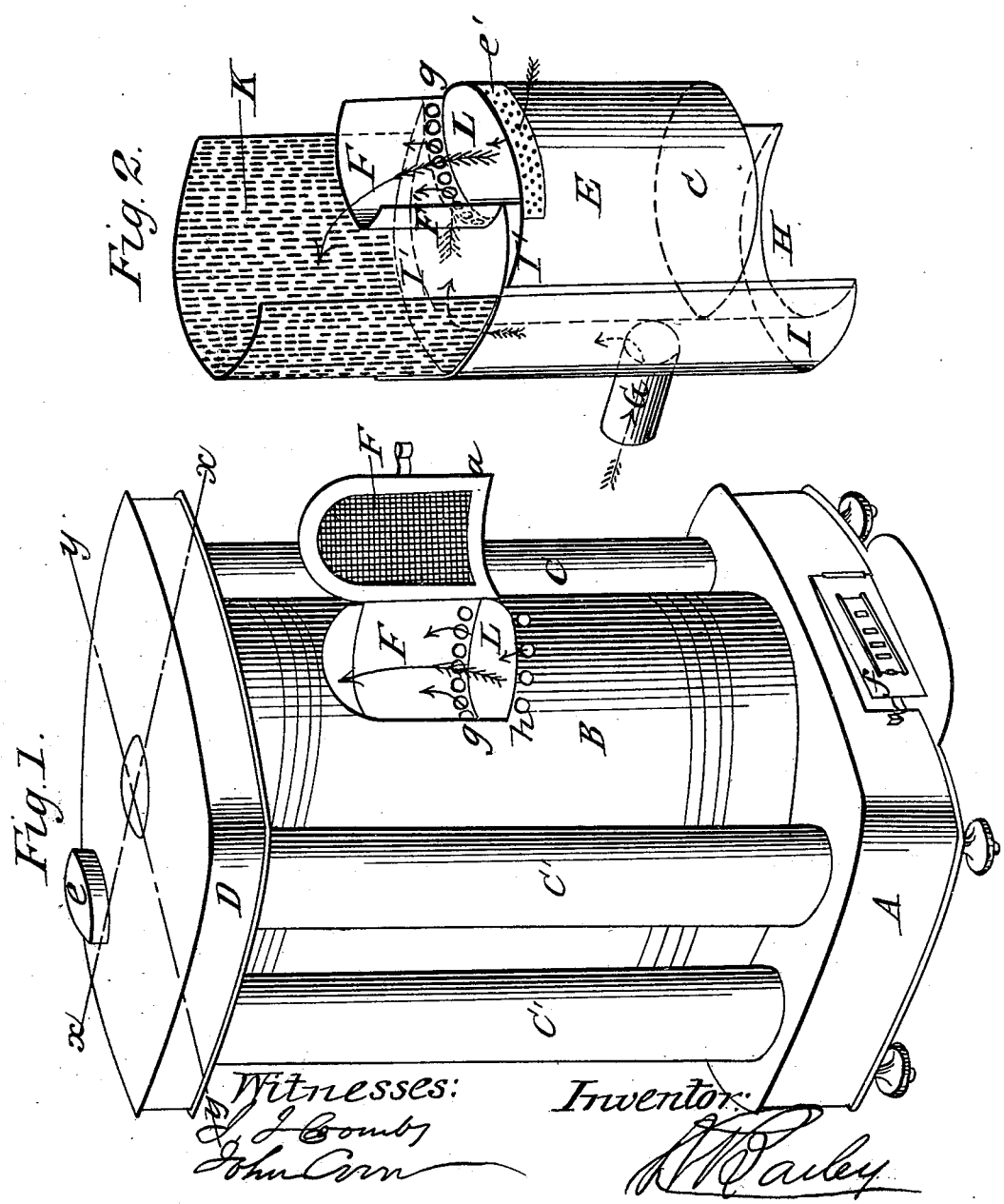

R. BAILEY.
Coal Stove.
No. 51,681. 2 Sheets—Sheet 2.
Patented Dec. 26, 1865.
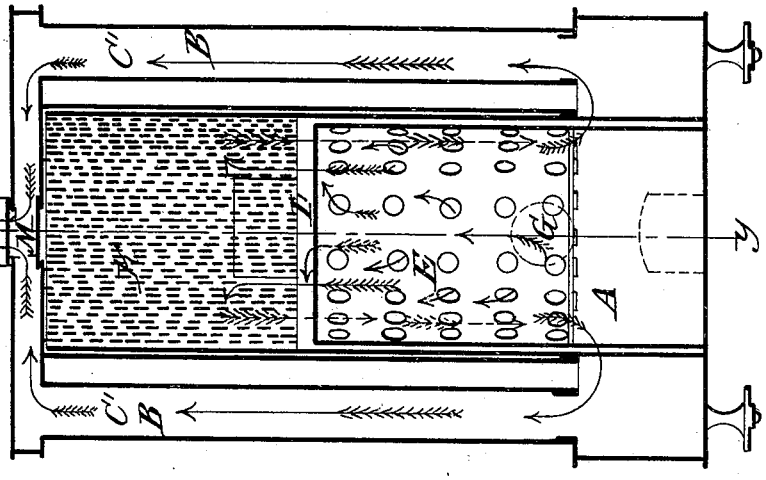
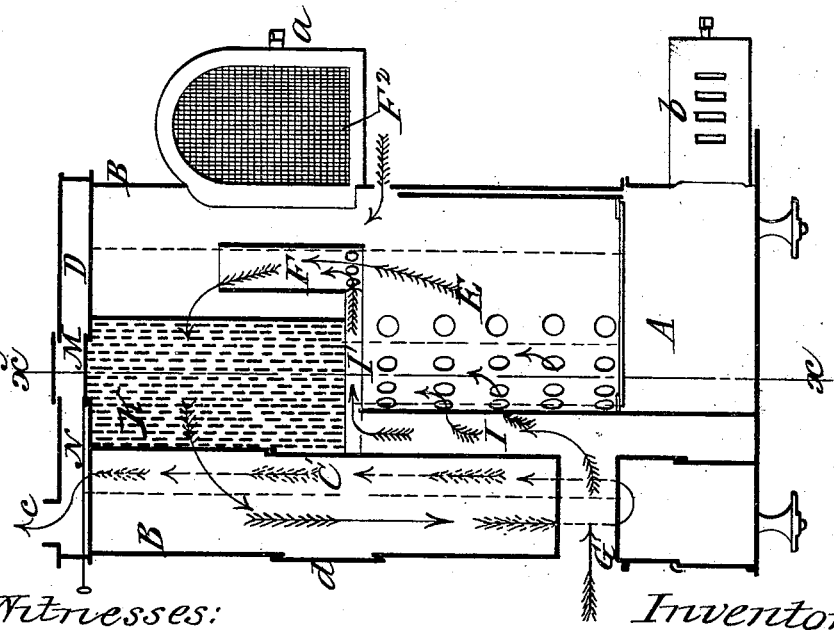
Witnesses:
Inventor:

UNITED STATES PATENT OFFICE.

ROBERT BAILEY, OF CLEVELAND, OHIO.

COAL-STOVE.

Specification forming part of Letters Patent No. 51,681, dated December 26, 1865.

*To all whom it may concern:*

Be it known that I, ROBERT BAILEY, of Cleveland, in the county of Cuyahoga and State of Ohio, have invented certain new and useful Improvements in Stoves for Burning Bituminous and other Coals, which improvements are applicable not only to stoves for heating, but to cooking-stoves, kitchen-ranges, and various kinds of furnaces; and I hereby declare the following to be a full, clear, and exact description of my invention as applied to a parlor-stove, reference being had to the accompanying drawings and the letters of reference marked thereon.

It may be safely averred that the coal-burners in common use are operated at a loss of from thirty-three to forty per centum of the fuel required for their supply by reason of imperfect and ineffectual combustion, as well of the carbon as of the carbonic-oxide, carbureted-hydrogen, and other gases evolved from the burning coal.

To obviate this loss by securing the most complete and economical combustion of all the elements of the fuel used, as well as the most effectual radiation and cheerful illumination, is the object of my invention, hereinafter described.

To enable others skilled in the art to make and use my invention, I will now proceed to describe its construction and operation.

In the accompanying drawings, Figure 1 represents an elevation of the stove in perspective. Fig. 2 is a perspective view of the interior structure, embracing the fire-pot, the cold-air induction-flue, the hot-air chamber, the inner wall of the flame-flue, and the perforated plate which divides the combustion-chamber from the diving-flue through which the products of combustion descend to the chamber in the base of the stove. Fig. 3 is a vertical section of the stove through its greatest transverse diameter, or through the red line $x\ x$ shown in Fig. 1. Fig. 4 is a vertical section through its shortest diameter, or through the red line $y\ y$ shown in Fig. 1.

A is the base of the stove, forming a chamber, to which the spent products of combustion descend through the diving-flue C from the combustion-chamber, and C' are four columnar radiating-flues, through which the heated products of combustion ascend from the chamber A to a chamber, D, at the top of the stove, from which they finally escape through the exit-flue $e$.

B is the external case of the stove.

E is the fire-pot, located in the front portion of the stove, the back wall of which, separating it from the hot-air chamber in its rear, is perforated with numerous holes of from one-fourth to one-half an inch in diameter, for the admission of air from said hot-air chamber to the fire.

F is an illuminating-flame flue, formed by an internal segmental plate, F', and an external wire-gauze or perforated plate, $F^2$, which may be a panel in the door for introducing fuel, said wire-gauze or perforated plate being on a line vertically with the front wall of the fire-pot, and said interior plate, F', being so placed as to contract the flame escaping from the fire-pot into a comparatively narrow space in the front portion of the stove. The flame is necessarily thrown directly against said wire-gauze or perforated exterior plate, through which it will be supplied with abundance of atmospheric air and oxygen to cause very active combustion of the gases and produce a fine illuminating effect through said wire-gauze or perforated plate. Below the perforated plate $F^2$ are a series of openings, $h$, in the outer casing of the stove, which admit cold air to the upper part of the fire-pot through a perforated plate, $h'$. Instead of a wire-gauze or perforated plate for illumination, a mica window may be used with perforations through, under, or around it for the admission of air to the flame.

G is a cold-air induction-pipe, and I is an air-chamber, into which the cold air is introduced through the induction-flue G, where it is heated by means of the burning fuel in the fire-pot acting on one side and the descending heated products of combustion acting on the other side.

I' is the upper portion of said hot-air chamber, extending over and covering the greater portion of the fire-pot, and $g$ are a series of perforations in the front wall of said chamber I', through which the heated air passes in currents or jets into the illuminating-flame flue, meeting the cold air from without and aiding to make the combustion of the gases perfect.

K is a perforated plate dividing the upper combustion-chamber from the diving-flue C. This I do not regard as absolutely essential in stoves of the class here represented, but will be found important in cooking-stoves and kitchen-ranges, and in some descriptions of parlor-stoves.

M is an opening in the lower plate of the chamber D, which may be opened or closed by means of a sliding damper, N, to cause a direct draft from the combustion-chamber to the exit-flue through the chamber D, or to cause the draft to perform a circuit through the diving-flue C to the chamber A, thence upward through the columnar flues C' to the chamber D and the exit-flue. A door, $d$, is placed in the rear portion of the outer case, through which the combustion-chamber over the fire-pot may be cleaned out.

The operation of the stove is as follows: In starting the fire the door $b$ of the chamber A, or its register, should be left open, allowing a draft of air up through the grate into the fire-pot; but when the coal has become well ignited said door and register should be closed. The supply of air to the fire will then come through the induction-flue G and the hot-air chamber I to the fire-pot through the perforations in the back wall thereof, and to the flame-flue through the perforations $g$ in the front wall of the portion I' of the hot-air chamber, and through the wire-gauze or perforated illuminating-plate $F^2$. Through the perforations in the back wall of the fire-pot, which may be covered by the coal, air will be introduced directly into the mass of burning coal, and through the perforations above the coal heated air will be conveyed to and mingled with the gases evolved from the burning coal supplying the requisite amount of oxygen to cause complete combustion thereof. From the illuminating-flame flue the flame and other products of combustion pass over the plate F' into what I call the "upper combustion-chamber;" thence through the perforated plate K, which checks their current until the air and gases become thoroughly mixed, causing complete consumption of the latter; thence through said perforated plate K into the diving-flue C to the chamber A; thence up through the flues C' to the chamber D, and out through the final exit-flue.

Having thus fully described my invention and its mode of operation, what I claim, and desire to secure by Letters Patent, is—

1. In combination with a hot-air chamber so located as to receive the heat directly from the fire-chamber on one side and from the escaping heated products of combustion on the other, the diving-flue C, the chamber A, and the radiating-flues C', arranged and operating substantially as described.

2. The illuminating-flame flue F, formed by the combination of the vertical plate F' and the exterior wire-gauze or perforated plate, $F^2$, arranged and operating substantially as described.

3. In combination with a hot-air chamber receiving the heat directly from the fire-chamber on the one side and from the escaping heated products of combustion on the other side, the illuminating-flame flue, into which heated air is introduced in small currents or jets from said hot-air chamber in its rear, and a supply of cold air is introduced through a wire-gauze or perforated plate in front, so that the currents of hot and cold air will meet in the flame-flue, substantially as described.

4. The perforated plate K, dividing the upper combustion-chamber from the flue through which the products of combustion pass away, substantially as and for the purpose described.

5. The combination of the fire-pot, the hot-air chamber, the illuminating-flame flue, and the wire-gauze or perforated illuminating-plate, all constructed and arranged substantially as shown and described.

R. BAILEY.

Witnesses:
J. J. COOMBS,
JOHN COON.